Nov. 8, 1955  C. W. TINKHAM  2,722,839
GYROSCOPIC CONTROL DEVICE
Filed April 28, 1953  3 Sheets—Sheet 1
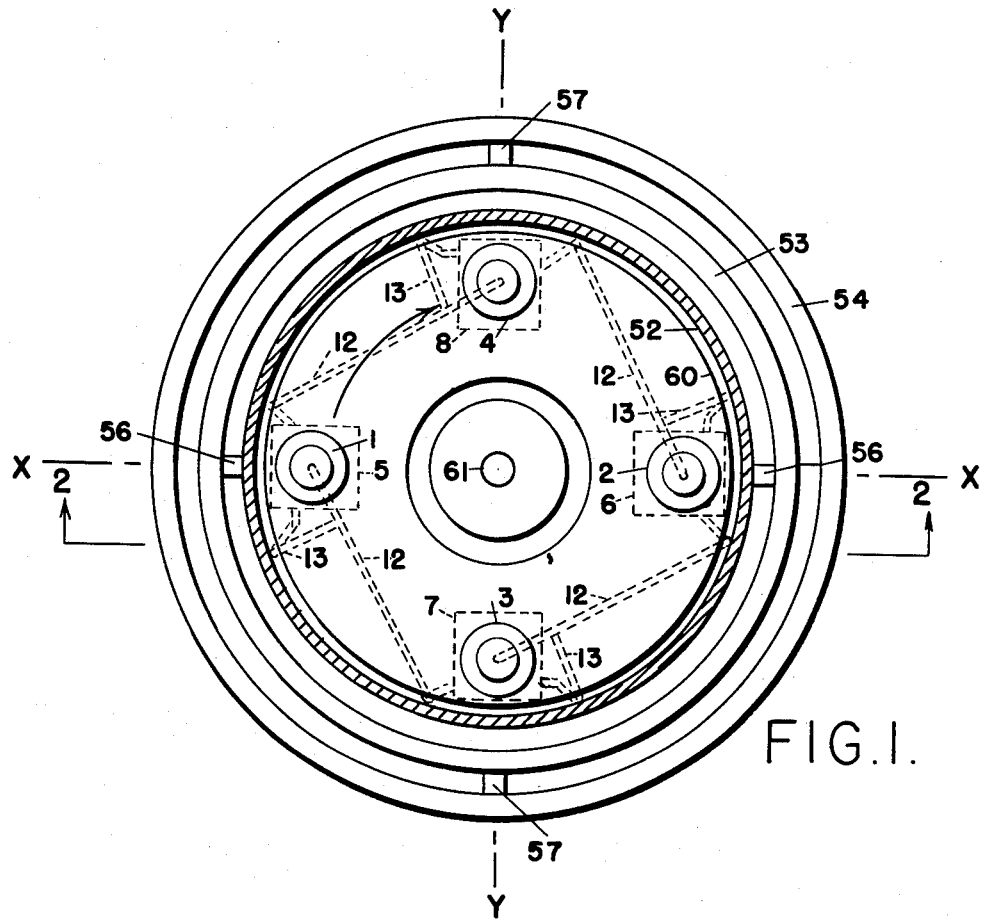
FIG.I.
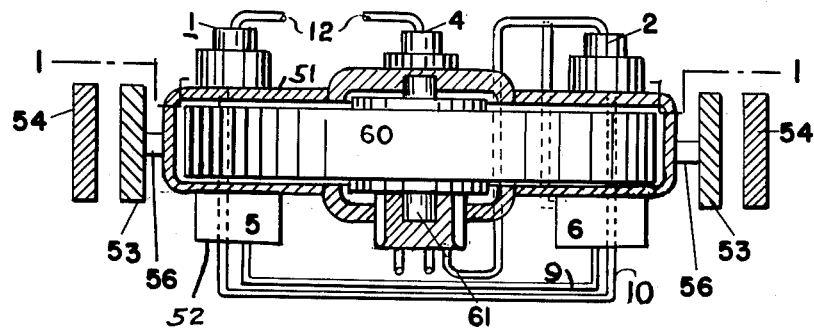
FIG.2.
*INVENTOR.*
CHARLES W. TINKHAM
BY *Howard J. Whelan.*
ATTORNEY Nov. 8, 1955  C. W. TINKHAM  2,722,839
GYROSCOPIC CONTROL DEVICE
Filed April 28, 1953  3 Sheets-Sheet 2

INVENTOR.
CHARLES W. TINKHAM
BY Howard J. Whelan
ATTORNEY

Nov. 8, 1955   C. W. TINKHAM   2,722,839
GYROSCOPIC CONTROL DEVICE
Filed April 28, 1953   3 Sheets-Sheet 3

INVENTOR.
CHARLES W. TINKHAM
BY Howard J. Whelan
ATTORNEY.

United States Patent Office 2,722,839
Patented Nov. 8, 1955

2,722,839

GYROSCOPIC CONTROL DEVICE

Charles W. Tinkham, Baltimore, Md.

Application April 28, 1953, Serial No. 351,549

6 Claims. (Cl. 74—5.44)

This invention relates to gyroscopic equipment and more particularly to means for maintaining the rotation of a gyroscope in a predetermined plane.

In this invention, a controlled amount of mercury or other suitable heavy flowing material, is transferred by pneumatic or fluid pressure, positive or negative, to a predetermined side of the gyroscopic unit, in such a manner as to exert a controlled force so as to restore the normal horizontal plane of rotation, incident to this unit.

The employment of a ballistic gravity couple is of previous development in the art, especially where the plane of rotation of a gyroscope operates in a vertical plane, as in the case of a gyroscopic compass. In this invention, new principles are involved in the operative use of mercury, as a means of exerting a controlled force to bring about a desired precession, and without depending on gravity as the sole means for producing the corrective functional effects resulting in this device. In accordance with the principles involved in this invention, the mercury in a selected component of the unit can be transferred from a lower to a higher elevation by proper controls in the system used, which result could not be had by gravity. This is especially the case where the gyroscopic rotor operates in a horizontal plane, and the unit is employed as a plane of reference.

An object of this invention is to provide a new and improved gyroscopic unit that avoids one or more of the disadvantages and limitations of the prior art.

Another object of this invention is to provide a new and improved gyroscopic unit having automatic control in a precessional phase and employing a combined fluid and pneumatic means to produce the necessary counteracting effects and restore the gyroscope to a horizontal plane of rotation.

A further object of the invention is to provide a new and improved gyroscopic adjunct adaptable for incorporation in a gyroscopic unit to maintain a horizontal plane of rotation, under all usual conditions of use, so it may be employed as a plane of reference.

Other objects will become apparent as the invention is more fully described.

The reaction of a gyroscope to a force that produces a couple about one of its axes, is to resist the force, but precession takes place about an axis perpendicular to the axis of the force, in a direction so as to place the plane of rotation in the plane of the force. If a vertical force is applied to the rim of the gyroscope (when the axis of rotation is approximately vertical), precession takes place in the same direction as the force, at a point 90° in the direction of rotation from the point at which the force was applied.

If unbalanced weight is applied, the force will be exerted by gravity, and the direction will be downward, precession will be downward at a point 90 degrees in the direction of rotation from the applied weight. The term "precession downward" is used to describe precession about a horizontal axis so as to cause the reference point to move in a downward direction about the axis.

The plane of rotation of the gyroscopic rotor is horizontal in this invention, and pneumatic vacuum or other pressure means may be employed to maintain the mercury in equilibrium throughout the system. Deviations from a horizontal plane of rotation tilt the gyroscope so that the mercury will flow from one area of the unit to another and induce the functioning of special valves that produce the counteracting force that brings about the desired precession.

For a better and more complete description of the invention reference is made to the accompanying drawings wherein a particular form of the invention is indicated. These drawings when used in conjunction with the following description illustrate the invention and emphasize the principles involved and its mode of operation, while the claims express the scope of the invention.

Referring to the drawings:

Figure 1 is a plan view taken on line 1—1 of Figure 2, piping being indicated in dotted lines;

Figure 2 is a sectional elevation taken on line 2—2 of Figure 1;

Similar reference characters refer to similar parts throughout the drawings.

Figure 3:
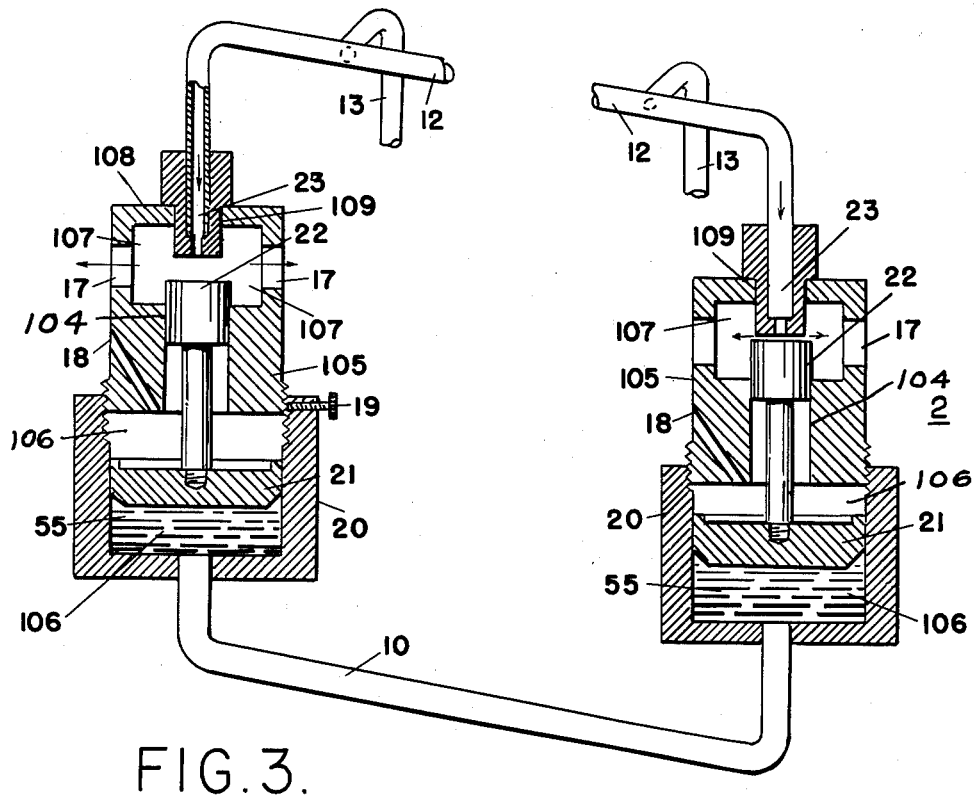
Figure 3 is a sectional view in elevation of two control valves illustrating different positions of their components.
Figure 4:
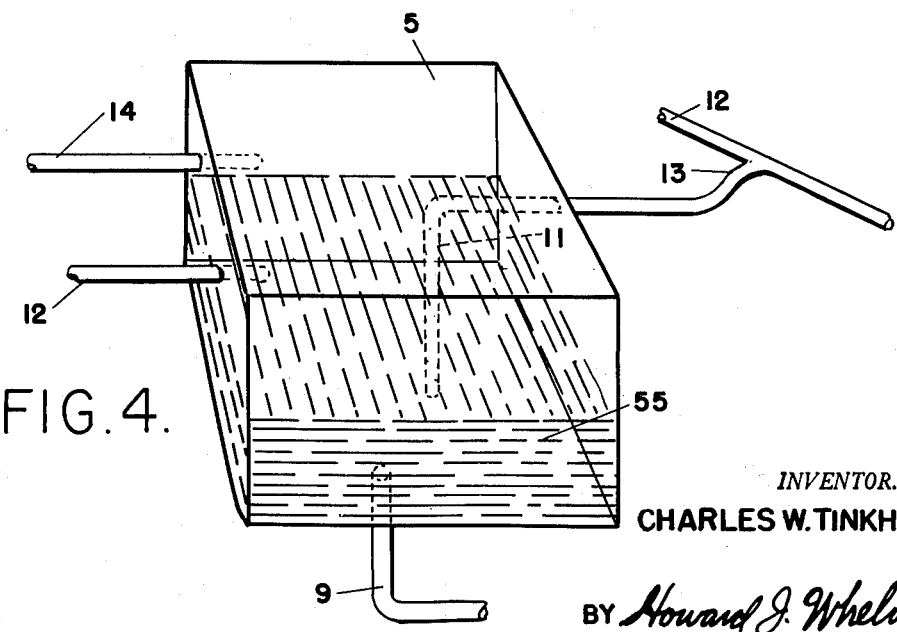
Figure 4 is a phantom view of a ballistic tank indicating its piping connections.

Referring to the drawings, which indicate a gyroscopic structure embodying the features of the invention. It is operated by a floating air pressure control acting through four valves 1, 2, 3 and 4, preferably mounted equidistantly on the top wall 51 of the gyroscopic rotor housing 52. The valves are rigidly attached and disposed 90° apart in a horizontal plane on a circle of predetermined diameter about the axis of the gyroscope, rotor 60. This is preferably done so that a vertical plane through two of the valves situated on opposite sides of the gyroscope is either 0° (zero degree) or 45° (forty-five degrees) from a similar plane through the trunnion axes 56 and 57 of its gimbal rings 53 and 54 of the gyroscope.

Disposed in the same vertical plane in similar positions and rigidly mounted on the lower wall 50 of the housing 52 are four ballistic tanks or reservoirs 5, 6, 7 and 8. Each tank is piped to the bottom of the tank on the opposite side of the gyroscope by a mercury tube or piping 9. This joins the tanks together in pairs. Also each tank is connected to the control valve that is situated 90° (ninety-degrees) forward in the direction of the rotation of the rotor 60 by air-line tube 12 or other suitable fluid pressure line. Thus the ballistic tank 8 is connected to and controlled by the valve 2, tank 6 by valve 3, tank 7 by valve 1, and tank 5 by valve 4. In a normal horizontal position the tanks are about half filled with mercury 55 or any other suitable liquid or material selected and employed in them. When each pair of opposing tanks are level, the mercury in each of them is also level. Reference to the term mercury is intended to include all material suitable for the purposes in question. Likewise the mercury in each pair of float chambers are also level.

In order to provide a constant service pressure to the ballistic tanks, air is supplied from an outside source to the piping or lines 15 in a ring arrangement and tapped into 14 leading in individual branches to each ballistic tank. Lines or piping 12 lead from the side wall of the ballistic tanks to the upper head of the adjacent control valve in the direction of rotation to supply air. Just before piping 12 enters each valve it branches off in a short tap or tube 13 to the top of the respective ballistic tank located underneath that particular valve, and terminates in a pending compensating section 11 near the bottom of the tank. This tube 13 varies the amount of mercury in it as the air pressure in it varies.

The control valves are similar and have the same general design indicated in Figure 3. Each consists of a chambered cylindrical shell 20 holding mercury within the cup formed in its base. This mercury supports and carries a float member 21 and raises or lowers it in a vertical plane, according to the mercury level therein. A cylindrical piston valve 22 is rigidly attached to the upper portion of the member 21 and rises or lowers with the latter. This piston 22 is restricted in diameter and slides within a cylindrical passage 104 formed in the cap-piece 105. This cap piece 105 is threaded exteriorly to fit in the wall of the shell 20 so as to provide an adjustment in the size or volume of the chamber 106 formed in the shell 20. Vent ports 18 lead from the chamber 106 to the exterior of the cap piece 105 in its upper portion and are so positioned that they will not be obstructed or covered by the piston 22 as the latter reciprocates. A lock screw 19 is arranged in the wall of the shell so as to permit the cap-piece 105 to be locked in any position it is adjusted to. A piping 10 leads to the bottom of the shell and into the float chamber 106 to allow the flow of mercury to level between selected valves oppositely positioned. The upper section of the cap-piece 105 is formed with an internal chamber 107 and in the walls are open windows 17 serving as vents for the equalizing air to continuously escape through, as later described. The covering wall 108 over the chamber 107 is arranged with an orifice 109 through which a fixed valve air jet 23 projects into the chamber. The face of the jet 23 is flat and so located that the flat face of the reciprocating piston 22 in rising will restrict the flow of air through it, while open it up on the down stroke. The jet 23 is tied in to the piping 12. The adjustment of the valve is readily accomplished and can be done by any user with average mechanical ability. Various counter-weights are placed on the gyroscope housing as needed or deemed desirable.

The gyroscopic structure is assembled into a unit, in which a circular rotor 60 is mounted on a vertical axial shaft 61 journalled in some conventional structure (not indicated). The rotor is of a suitable design and is built in the housing 52. The housing 52 has a pair of diametrically positioned trunnions 56 freely and radially supported on a gimbal ring 53. The latter likewise is supported similarly on the second gimbal and external ring 54 on the trunnions 57 situated at right angles to the trunnions 56 and in the same plane. The gimbal rings provide the facility for the normal movements of the gyroscope.

The trunnions permit the rotor plane to vary in tilt from the horizontal plane, by swinging on their axis individually or collectively. To maintain a horizonal plane, the control valves and ballistic tanks included in this specification are provided and function as described in the following outline of the operation of the unit. The main purpose of this invention is to maintain the rotor in its normal horizontal plane and to overcome any tendency to vary such by forcing it to return to the normal plane.

Figure 5:
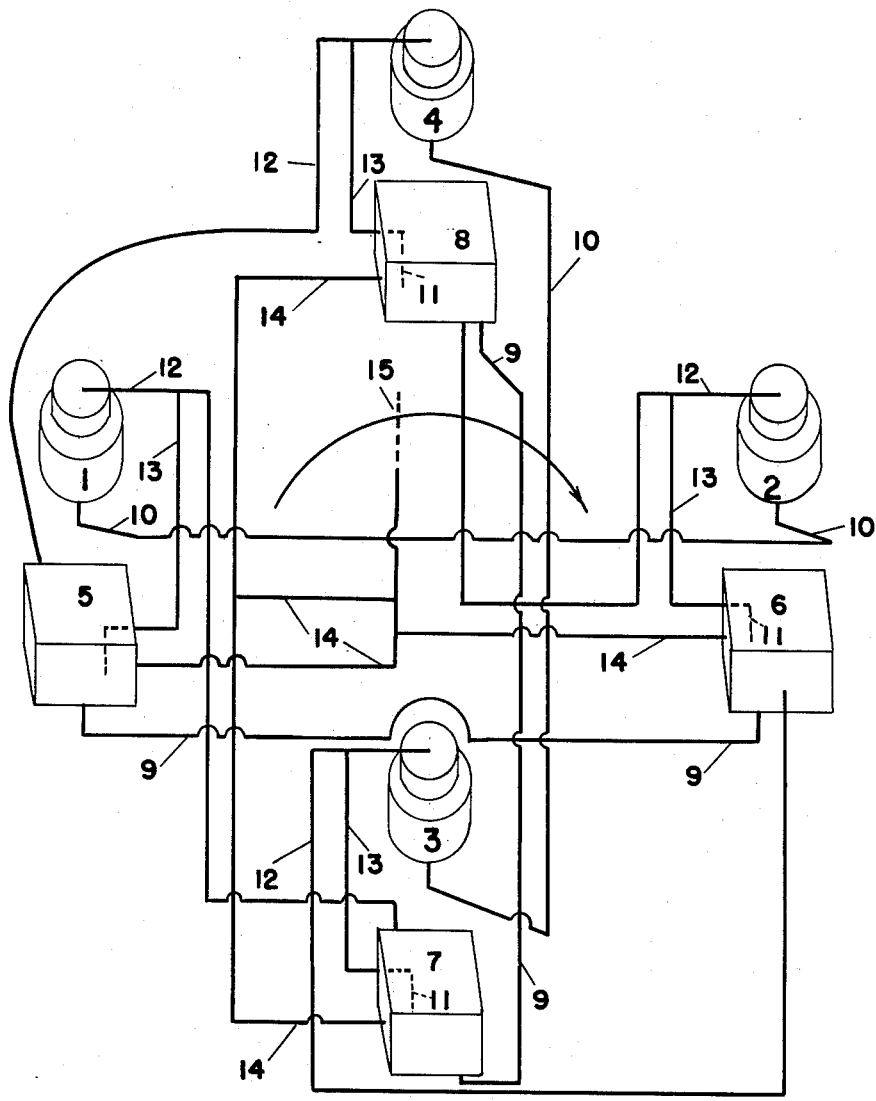
Figure 5 is a diagrammatic outline of the piping connections between the ballistic tanks and control valves.

In the functioning of this device it is assumed that the gyroscopic unit whose plane of rotation is in a horizontal plane and normally operating. The mercury in each pair of ballistic tanks is normally level, and the service air pressure is flowing through the piping 15 and 14 to the ballistic tanks and thence through piping 12 to the control valves, as may be noted in the diagrammatic outline in Figure 5. The air leaks or passes into the upper cap-piece 105 through the air jet 23 into the chamber 107 and out of the openings or windows 17 into the surrounding atmosphere. When passing through the chamber 107 the air passes between the surfaces of 23 and 22 facing one another, in proportion to their relative positions with each other. Each tank and control valve receives the same amount of air under the same pressure by reason of the even distribution provided by the ring arrangement and particularly each opposite pair.

When the plane of rotation of the gyroscopic unit is horizontal, the air pressure from the service line 15 is applied equally in all ballistic tanks, consequently the mercury is in equilibrium throughout the system.

Deviations from the horizontal plane of rotation tilt the unit so that the mercury from the float chambers 20 of the control valves gravitates from the higher to the lower valves. For example:

Assuming that the gyroscope unit is tilted about the axis Y—Y in Figure 1, so that the valve 1 is lower than the valve 2, mercury from the valve 2 gravitates into valve 1. This raises the mercury level in the float chamber of the latter and incidentally raises the floating valve member 21 in valve 1, while lowering the floating member 21 in valve 2. This separates the piston 22 and jet further apart in valve 2, thereby increasing the flow of air through it, while reducing the flow through valve 1, where such spacing is reduced. The consequent differential in back pressure between ballistic tank 7 and the ballistic tank 8, transfers mercury from the ballistic tank 7 through the tube 9 into ballistic tank 8. The unbalanced weight of mercury in the ballistic tank 8 causes precession downward at valve 2, and acts to correct the deviation from a horizontal plane of rotation. As the unit approaches a horizontal plane, the mercury gravitates from valve 1, back into the valve 2 reducing the pressure differential between ballistic tank 7 and ballistic tank 8, permitting the excess mercury in ballistic tank 8 to gravitate back into 7, so that when the plane of rotation is again horizontal, the pressures in the ballistic tanks will be in balance and the mercury in equilibrium.

Referring again to Figure 1, the control valves 1 and 2 in conjunction with the ballistic tanks 7 and 8 correct deviations from a horizontal plane of rotation, which occur about the axis of precession Y—Y. The control valves 3 and 4 with the ballistic tanks 5 and 6 correct deviations which occur about the axis of precession X—X. Thus deviations from a horizontal plane of rotation which occur about any horizontal axis will be corrected by one or both controls.

It will be noted that the air pressure in each ballistic tank 5, 6, 7 and 8 is controlled by its respective control valve 1, 2, 3, 4 situated 90° in the direction of rotation from that tank, while the air pressure in each compensating tube 13 is controlled by the valve directly above that tube.

Assuming that a deviation occurs about the axis X—X so that the control valve 4 is lower than the control valve 3, mercury gravitates from this valve 3 into the valve 4. Mercury also simultaneously gravitates from the ballistic tank 7 into the ballistic tank 8, while the air pressures remain balanced and constant in these tanks.

The differential in back pressures caused by the operation of the control valves 3 and 4 transfers mercury from the ballistic tank 5 into the ballistic tank 6 causing precession downward at valve 3, to correct the deviation. Part of that differential (determined by the proportionate areas of the compensating tube and the ballistic tank) is applied by means of the compensating tubes to the ballistic tanks 7 and 8. This displaces from the ballistic tank 7 a quantity of mercury sufficient to cause equilibrium about the axis X—X of the gyroscope.

A multiplying factor is involved in the operation of the control valves and the consequent transfer of mercury. Back pressure control valves are extremely sensitive, a very small movement of the floating member 21 causes a change in back pressure. A pressure differential of six ounces p. s. i. between the two ballistic tanks will result in a differential in mercury levels of .765 inch between the two tanks. Therefore in a practical sense, the mercury level in the ballistic tanks is conditioned by the angle of deviation or tilt, from the horizontal plane of rotation within the limits of accuracy determined by the gravitation of mercury from one valve chamber to the other. Thermal expansion or contraction in the control valve chambers occurs simultaneously in all valves and therefore does not disturb the pressure balance of the system. Counterweights are employed where such are deemed necessary to balance the gyroscope and are not indicated, as their locations are variable.

Some of the unique features characteristic of this invention include its capacity to make a gyroscopic unit sensitively accurate in maintaining its normal plane of rotation; to have this means for doing so augmented by a source of power for facilitating its operation distinct from gravitational influence, to be applicable to conventional gyroscopic apparatus without involving abnormal expense and trouble, and to avoid the use of complicated components in its make up.

Although one type of valve is illustrated and described in the operation of the device it is appreciated that other types of valves could be used to operate efficiently in this system. If vacuum were used instead of pressure to transfer the mercury from tank to tank, the piping would be changed accordingly.

While but one general form of the invention is illustrated in this application for Letters Patent, it is appreciated that other forms of constructions could be designed and employed, that would embody the same principles and come within the scope of the appended claims.

Having thus described the invention, what is claimed is:

1. In combination with a gyroscope, having a casing including an upper wall and a lower wall, precession means comprising a plurality of control valves disposed on the upper wall of the gyroscope, a plurality of ballistic tanks disposed on the lower wall of the gyroscope, a system of piping connecting said valves and tanks in predetermined sequence, mediums adapted to flow in said piping between the valves and tanks independently of each other, said valves and tanks being normally maintained in a horizontal plane and leveling their mediums therein, said mediums being automatically adjusted to new levels if the valves and tanks are moved out of their horizontal plane by the tilting of the gyroscope and cooperatively actuating their flow to produce a force acting on the gyroscope through said tanks and valves to counteract the tilt and return the gyroscope to its normal horizontal plane of rotation.

2. In combination with a gyroscope having a casing including an upper wall and a lower wall, precession means comprising a plurality of control valves disposed on the upper wall of the gyroscope, a plurality of ballistic tanks disposed on the lower wall of the gyroscope, a system of piping connecting said valves and tanks in predetermined sequence, mediums adapted to flow in said piping between the valves and tanks independently of each other, said valves and tanks being normally maintained in a horizontal plane and leveling their mediums therein, said mediums automatically being adjusted to new levels if the valves and tanks are moved out of their horizontal plane by the tilting of the gyroscope and cooperatively actuating their flow to produce a force acting on the gyroscope through said tanks and valves to counteract the tilt and return the gyroscope to its normal horizontal plane of rotation, a portion of said mediums being of material readily flowable through their respective piping and another portion of said mediums being of pneumatic nature, and flowing in their respective piping.

3. In combination with a gyroscope, having a casing including an upper wall and a lower wall, precession means comprising a plurality of control valves disposed on the upper wall of the gyroscope, a plurality of ballistic tanks disposed on the lower wall of the gyroscope, a system of piping connecting said valves and tanks in predetermined sequence, mediums adapted to flow in said piping between the valves and tanks independently of each other, said valves and tanks being normally maintained in a horizontal plane and levelling their mediums therein, said mediums being automatically adjusted to new levels if the valves and tanks are moved out of their horizontal plane by the tilting of the gyroscope and cooperatively actuating their flow to produce a force acting on the gyroscope through said tanks and valves to counteract the tilt and return the gyroscope to its normal horizontal plane of rotation, a portion of said mediums being of material readily flowable through their respective piping and another portion of said mediums being of pneumatic nature, and flowing in their respective piping, said valves being subject to a continuous pressure therethrough by said mediums of a pneumatic nature and escaping through ports provided in the walls of said valves and float means actuated in said valves by the other mediums to control the amount of the escaping medium and build up back pressure in said piping and distribute the other mediums in proportionate amounts to said tanks to cause precession toward the horizontal plane of rotation.

4. A gyroscopic unit, comprising a gyroscope including a rotor arranged for rotation in a predetermined plane and with a housing encasing it, said gyroscope also including gimbal rings interconnected to said housing for the free movement of the parts of the gyroscope in a conventional manner, a plurality of control valves mounted on said housing at predetermined locations, a plurality of ballistic tanks also mounted on the housing at predetermined locations, piping leading from and to said valves and tanks in predetermined arrangement, mercury at a predetermined level in each of said valves to control the operation thereof, said valves also being supplied with air pressure from said piping under the control of said ballistic tanks as the level of the mercury varies, mercury also in said tanks at a predetermined level equalized through said piping, said level being sustained while the gyroscope is in said plane of rotation and varying under said pressure when tilted from said plane, the tanks being proportionally filled with mercury in coordination with the tilting, through the variation in pressure caused by the valves incident to the tilting, a compensating tube leading to the tanks to prevent gravitation of mercury from the high to the low ballistic tank, whereby the effect of precession is counteracted and the gyroscope returned to its normal plane of rotation.

5. A gyroscopic unit, comprising a gyroscope including a rotor arranged for rotation in a predetermined plane of rotation and with a housing encasing it, said gyroscope also including gimbal rings interconnected to said housing for the free movement of the parts of the gyroscope in a conventional manner, a plurality of control valves mounted on said housing at predetermined locations thereon, a plurality of ballistic tanks also mounted on the housing at predetermined locations, piping leading from and to said valves and tanks in predetermined arrangement, mercury at a predetermined level in each of said valves to control the operation thereof, said valves also being supplied with air pressure from said piping under the control of said ballistic tanks as the level of the mercury varies, mercury also in said tanks at a predetermined level equalized through said piping, said level being sustained while the gyroscope is in said plane of rotation and varying under said pressure when tilted from said plane, the tanks being proportionally filled with mercury in coordination with the tilting through the variation in pressure caused by the valves incident to the tilting, a compensating tube leading to the tanks to prevent gravitation of mercury from the high to the low ballistic tank, whereby the effect of precession is counteracted and the gyroscope returned to its normal plane of rotation, said valves and tanks being arranged over one another in sets and located at equal distances around the gyroscope with the piping to equalize the mercury displacement between valves and tanks connected to one another in pairs oppositely positioned on the gyroscope.

6. A gyroscopic unit, comprising a gyroscope including a rotor arranged for rotation in a predetermined plane of rotation and with a housing encasing it, said gyroscope also including gimbal rings interconnected to said housing for the free movement of the parts of the gyroscope in a conventional manner, a plurality of control valves mounted on said housing at predetermined locations thereon, a plurality of ballistic tanks also mounted on the housing at predetermined arrangement, mercury at a predetermined level in each of said valves to control the operation thereof, said valves also being supplied with air pressure from said piping under the control of said ballistic tanks as the level of the mercury varies, mercury also in said tanks at a predetermined level equalized through said piping, said level being sustained while the gyroscope is in said plane of rotation and varying under said pressure when tilted from said plane, the tanks being proportionally filled with mercury in coordination with the tilting, through the variation in pressure caused by the valves incident to the tilting, a compensating tube leading to the tanks to prevent gravitation of mercury from the high to the low ballistic tank, whereby the effect of precession is counteracted and the gyroscope returned to its normal plane of rotation, said valves and tanks being arranged over one another in sets and located at equal distances around the gyroscope with the piping to equalize the mercury displacement between valves and tanks connected to one another in pairs oppositely positioned on the gyroscope, valves and tanks being such as to provide a 90° spacing between them and the piping arranged for a valve and tank operatively joined to operate together so that a force induced in one will react at a point 90° forward in the direction of rotor direction.

References Cited in the file of this patent
UNITED STATES PATENTS

| | | |
|---|---|---|
| 1,763,806 | Methvin | June 17, 1930 |
| 2,434,488 | Dolude | Jan. 13, 1948 |
| 2,457,150 | Herondelle | Dec. 28, 1948 |
| 2,530,154 | Davis | Nov. 14, 1950 |